T. W. Porter,
Belt Clasp.

N° 75,970.   Patented Mar. 24. 1868.

Witnesses
Albert R. Swett
Edw. F. Brown

Inventor
T. W. Porter

United States Patent Office.

T. W. PORTER, OF BOSTON, MASSACHUSETTS.

Letters Patent No. 75,970, dated March 24, 1868.

IMPROVED BELT-CLASP.

The Schedule referred to in these Letters Patent and making part of the same.

TO ALL WHOM IT MAY CONCERN:

Be it known that I, T. W. PORTER, of Boston, in the county of Suffolk, and State of Massachusetts, have invented a new and useful or Improved Belt-Clasp; and I do hereby declare that the following is a full, clear, and exact description of the construction and operation of the same, reference being had to the accompanying drawings, making a part of this specification, in which—

Similar letters of reference indicate corresponding parts in the several figures.

The nature of my invention consists in a belt-clasp, formed of a plurality of fingers, each with a hole or eye at one end, and a right-angled bar at the other, the fingers passing through holes in the ends of the belt, and the bars on the fingers securing one end of the belt, while a small rod inserted in the eyes of the fingers secures the opposite end of the belt.

Figure 2:
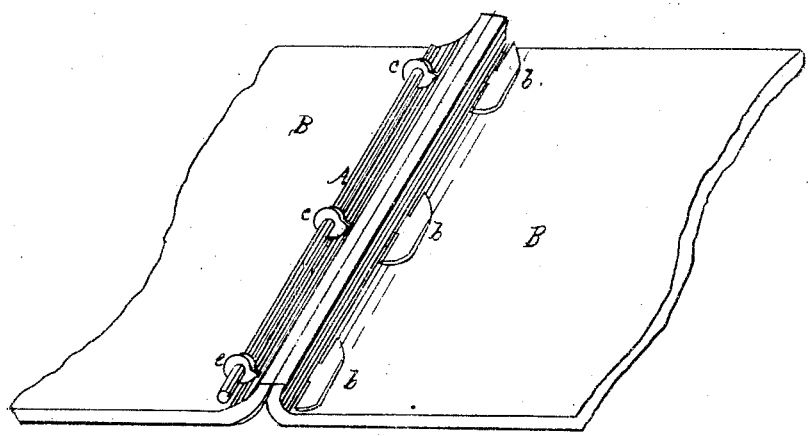
Figure 2 is a perspective view of the same, applied to a belt.
Figure 1:
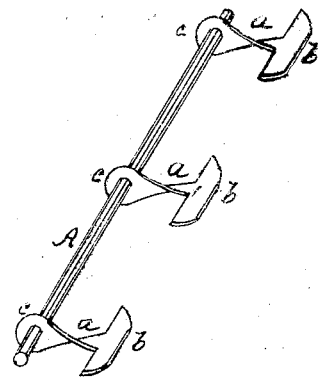
Figure 1 is a perspective view of the clasp.
Figure 3:
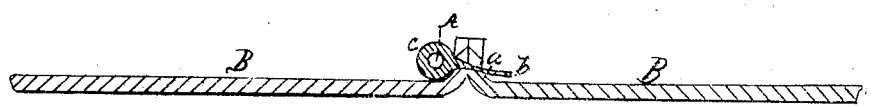
Figure 3 is a longitudinal vertical section of fig. 2.

In the drawings, $a\ a\ a$ represent the fingers, and $b\ b\ b$ the bars formed upon the fingers, while A is the rod which is inserted in the holes or eyes of the fingers. B B are the two ends of the belt, to connect which the fingers $a$ are first passed through holes in the belt from the outer to the inner side, then through similar holes in the other end of the belt from the inner side, when the rod A is inserted in the eyes, as shown in fig. 2, thereby firmly uniting the ends of the belt.

The eyes in fingers $a$ may be formed by a hole drilled or punched in thick metal, as shown in the drawings, or by forming the fingers of sufficient length, with a bar at either both or one of the ends, and then, by folding, produce the eyes for rod A.

Having thus described my invention, what I claim as new, and desire to secure by Letters Patent, is—

1. A belt-clasp, consisting of a plurality of fingers $a$, each with a separate bar, $b$, and an eye, with the rod A inserted therein, substantially as described and shown.

2. I claim, as a new article of manufacture, the fingers $a$, when constructed with the bar $b$, and eye for rod A, when constructed substantially in the manner as and for the purposes specified.

T. W. PORTER.

Witnesses:
ALBERT R. SWETT,
EDM. F. BROWN.